US007055912B2

(12) United States Patent
Luscombe

(10) Patent No.: US 7,055,912 B2
(45) Date of Patent: Jun. 6, 2006

(54) VEHICLE MOUNTED UTILITY APPARATUS WITH QUICK ATTACHMENT MEANS

(76) Inventor: Terry Lynn Luscombe, P.O. Box 109, Highway 15 South., Armstrong, IA (US) 50514

( * ) Notice: Subject to any disclaimer, the term of this patent is extended or adjusted under 35 U.S.C. 154(b) by 350 days.

(21) Appl. No.: 10/668,439

(22) Filed: Sep. 23, 2003

(65) Prior Publication Data
US 2005/0098380 A1 May 12, 2005

(51) Int. Cl.
B60P 1/02 (2006.01)
E04G 1/00 (2006.01)

(52) U.S. Cl. ..................... 298/22 R; 182/2.9
(58) Field of Classification Search ............. 298/22 R, 298/17 R, 17 B, 17 S, 17 SG, 22 AE, 22 C; 182/2.9; 414/495
See application file for complete search history.

(56) References Cited
U.S. PATENT DOCUMENTS 3,119,503 A * 1/1964 Herpich et al. ............. 414/495
3,204,796 A * 9/1965 Hand ......................... 414/498
4,762,199 A * 8/1988 Holmes ....................... 182/2.9
5,562,390 A * 10/1996 Christenson ................. 414/477
5,829,946 A * 11/1998 McNeilus et al. ........... 414/495
6,250,423 B1 * 6/2001 Bartsch ....................... 182/2.1
6,810,993 B1 * 11/2004 Promersberger et al. ..... 182/2.9
2003/0213644 A1 * 11/2003 Chard et al. ................. 182/2.4
2004/0016596 A1 * 1/2004 Promersberger et al. ..... 182/2.9
2004/0055817 A1 * 3/2004 Chard et al. ................. 182/2.4

* cited by examiner

Primary Examiner—H Gutman
(74) Attorney, Agent, or Firm—Herman H Bains

(57) ABSTRACT

A utility apparatus including lift apparatus and dump body apparatus is provided with quick attachment means to permit ready mounting of the utility apparatus on the support frame of a vehicle. The utility apparatus includes a mounting frame having shiftable support members for supporting the apparatus in a free standing position above a support surface. The support members are moved to a transport position when the utility apparatus is mounted on a vehicle frame. Cooperating hooks on the apparatus mounting frame engage and lock to pins on the vehicle support frame. Releasable latch members on the apparatus mounting frame and vehicle support frame latch the utility apparatus on the vehicle support frame.

6 Claims, 4 Drawing Sheets

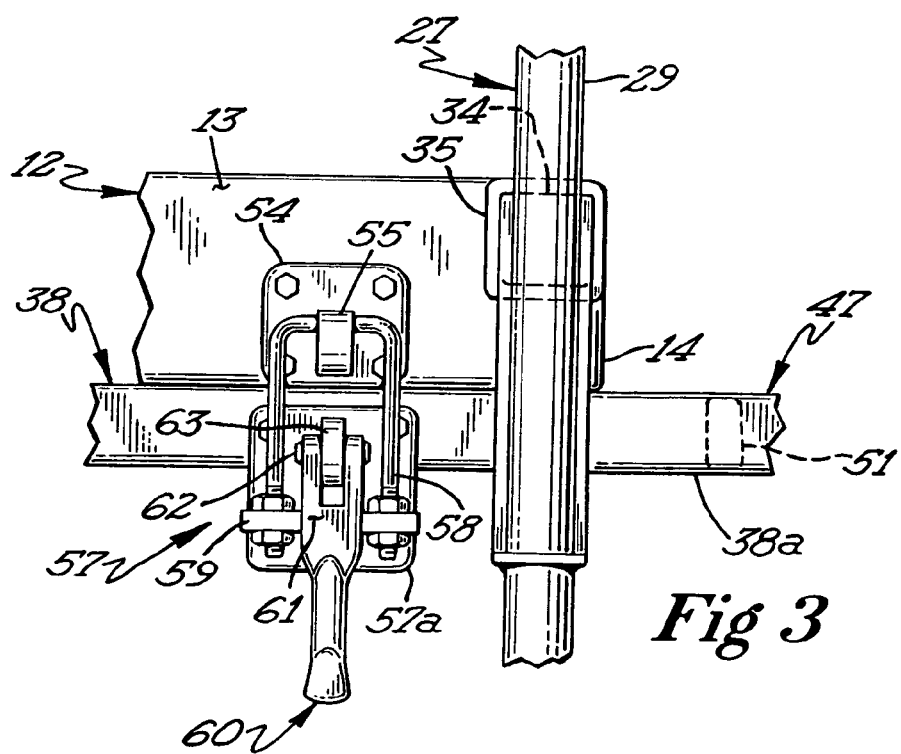
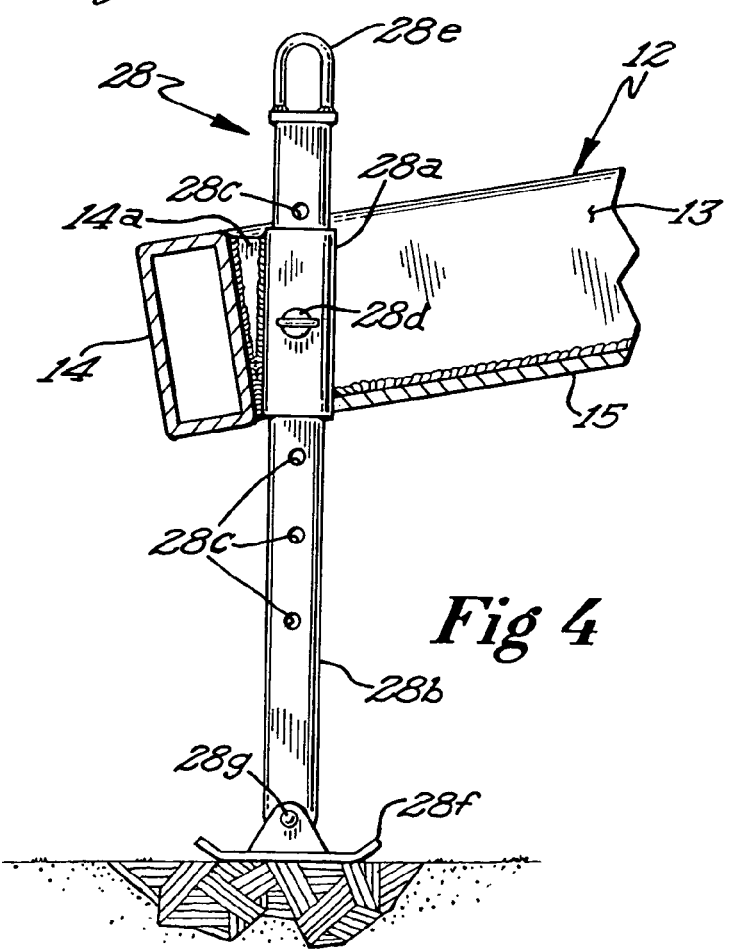

VEHICLE MOUNTED UTILITY APPARATUS WITH QUICK ATTACHMENT MEANS

FIELD OF THE INVENTION

This invention relates to a utility apparatus having quick attachment means for readily mounting and dismounting on a vehicle.

BACKGROUND OF THE INVENTION

There are a number of smaller utility apparatuses that are typically mounted on pickup and similar trucks that require considerable time and effort in mounting and removing the utility apparatus. Such apparatus include lift apparatus, dump boxes, sprayers and the like. The present invention is directed to providing a quick attachment means for mounting the utility apparatus on a vehicle.

SUMMARY OF THE INVENTION

An object of this invention is to provide a novel quick attachment system for readily mounting a utility apparatus on a vehicle.

In one embodiment of the invention, a lift apparatus is provided with quick attachment means for engaging and interlocking with cooperating locking means on a vehicle.

In another embodiment, a dump box is provided with quick attachment means for releasably mounting and dismounting the dump box on and from a vehicle.

In the embodiments shown, the quick attachment means includes latching elements on the front end portion of the utility apparatus mounting frame which engage latching elements on the vehicle support frame. Locking hooks are located on the rear end of the mounting frame of the utility apparatus which engage locking pins located on the rear end portion of the support frame. The utility apparatus is provided with support members which support the apparatus in an elevated position.

When the vehicle is backed up so that the mounting frame of the utility apparatus is located above the support frame of the vehicle, the locking pins will engage the hooks on the mounting frame of the utility apparatus. The support jacks will then be moved to a transport position and the cooperating latch elements on vehicle and utility apparatus will be interlocked together. The entire mounting and dismounting operation requires only a matter of minutes.

BRIEF DESCRIPTION OF THE FIGURES OF THE DRAWING

FIG. 3 is an enlarged fragmentary view of the cooperating latch elements on the lift apparatus and vehicle in the latched condition;

FIG. 4 is a cross-sectional view of the rear portion of the mounting frame of the lift apparatus showing a rear support member.

DESCRIPTION OF THE PREFFERED EMBODIMENT

Figure 1:
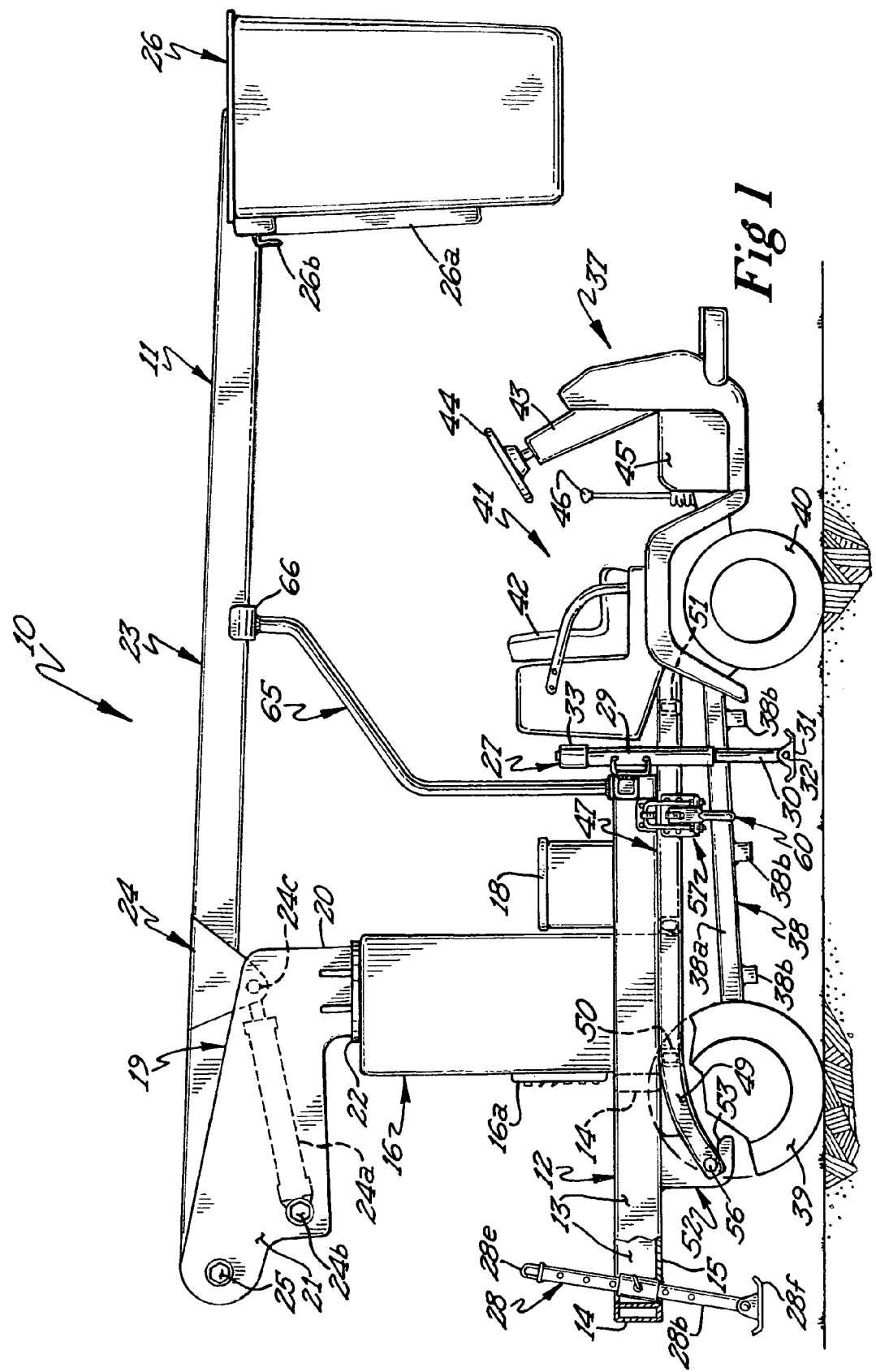
FIG. 1 is a side elevational view of a lift apparatus mounted on a vehicle, both the lift apparatus and vehicle having the quick attachment means.
Figure 2:
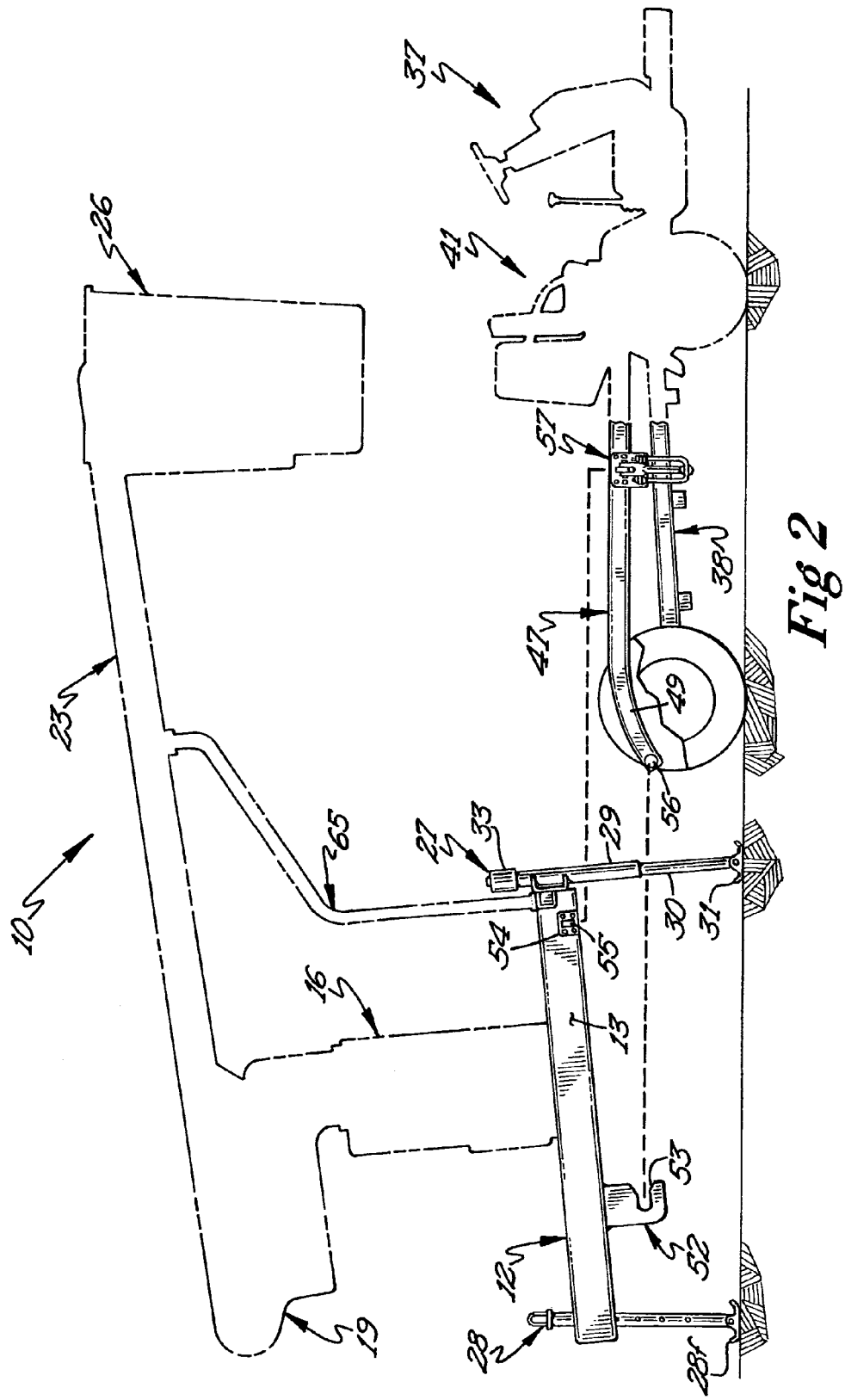
FIG. 2 is a side elevational view similar to FIG. 1 showing the lift apparatus separated from and in a free standing position relative to the vehicle.

Referring now to the drawings, and more particularly to FIGS. 1 and 2, it will be seen that one embodiment of the invention is there shown. In FIG. 1 a lift apparatus is shown mounted on a utility vehicle although many types of utility apparatuses may be provided with quick attachment means. The entire apparatus (lift apparatus and vehicle) shown in FIG. 1 is generally designated by the reference numeral 10.

The utility lift apparatus 11 includes a generally rectangular shaped mounting frame 12 including elongate longitudinal frame members 13 and elongate transverse frame members 14 rigidly interconnected to the longitudinal frame members. A substantially flat, rigid rectangular floor 15 is mounted on the frame 12. The frame and floor are formed of a suitable metal. A generally rectangular or parallelepiped housing 16 is mounted on the floor and contains the hydraulic and electrical components for operating the lift apparatus. A control panel 16a is mounted on the housing 16 and contains control elements for operating the apparatus. An auxiliary housing 18 is mounted on the floor 15 and contains batteries and other components.

The lift apparatus 111 includes an elongate lower L-shaped arm 19 including a vertical portion 20 and a horizontal portion 21. The vertical portion 20 is provided with a flat turntable 22 which is rotatably mounted on the upper surface of the housing 16. An elongate upper lift arm 23 is pivotally connected to one end of the horizontal portion of the lower arm 19 by a pivot 25.

A pair of bracket plates 24 are secured to the upper arm 23 and extend therefrom. A double acting hydraulic piston and cylinder unit 24a is pivotally connected to the lower arm 19 by a pivot pin 24b. The outer end of the piston rod is pivotally connected to the plates 24 by a pivot pin 24c. Extension and retraction of the unit 24a raises and lowers the upper arm 23 in a well known manner. The turntable 22 enables the upper and lower arms to rotate as a unit about a vertical axis.

The outer end of the upper arm 23 is provided with an operator bucket 26 which is pivotally connected thereto. The operator bucket is an open top container and is provided with an access door 26a having a handle 26b. Suitable controls are provided for enabling the operator to manipulate the lift apparatus.

Referring now to FIGS. 2 and 3, it will be seen that the lift apparatus, when dismounted from a vehicle, is free standing and is supported by vertically adjustable jacks and a rear support member. A pair of vertically adjustable front jacks 27 support the front of the lift apparatus and a single rear support member 28 support the lift apparatus at the rear end portion thereof. The front jacks 27 each include an elongate upper tubular member 29 which telescopically receives a lower tubular member 30. The lower end of the lower tubular member 30 has a foot element 31 pivoted thereto by a pivot 32 which enables a self-leveling action by the foot element. An electric motor 33 is mounted on the upper end of the upper tubular member and is operatively connected to the lower tubular member. Operation of the motor 33 causes the lower member 30 to extend and retract (screw jack) in a well known manner.

The upper tubular member 29 of the front jacks are each secured to a horizontal, elongate inner square tube 34. In FIG. 2, the upper tubular member 29 of each jack is shown secured to the tube 34 by a bracket. However, in FIG. 3, the upper tubular member 29 of each jack is secured to the outer end of the square tube 34 which is the preferred embodiment. The inner square tube 34 is telescopically received in an outer horizontal square tube 35 to permit extension an retraction of the inner square tube.

In the free standing condition, the front jacks 27 are extended laterally outwardly and are extended vertically as shown in FIG. 2. Referring now to FIG. 4, the rear support member 28 includes an upper outer tubular member 29 having a lower tubular member 28b telescopically received therein. The lower tubular member 28b has a plurality of vertically spaced apart opening 28c therein. A locking pin 28d extends through an opening in the upper tubular member 28a and a selected opening or openings 28c in the lower tubular member. A self-leveling foot element 28f is pivoted to the lower end of the lower tubular element 28b by a pivot pin 28g. The upper end of the lower or inner tubular element 28b is provided with a handle 28e for facilitating adjustment of each rear support member or leg.

Referring again to FIG. 4, it will be seen that the outer tubular member 28a of the rear support member 28 is secured to the rear transverse frame member 14 by a bracket plate 14a. It will be noted that the rear support member 28 is inclined causing the lift apparatus to be inclined upwardly in a forward direction. The single rear support member 28 is secured to the center portion of the rear transverse member 14. When the front jacks and rear support member are in the transport position the jacks and support member will be retracted or elevated, as shown in FIG. 1, and the front jacks 27 will be moved inwardly.

The lift apparatus 11 is mounted on a small utility vehicle 37 having an internal combustion engine and a vehicle chassis 38. The chassis 38 includes elongate longitudinal frame members 38a and transverse frame member 38b. The vehicle is provided with conventional rear ground wheels 39 and front wheels 40. A driver compartment 41 is provided with a seat 42 and a steering column 43 having a steering wheel 44. The vehicle is also provided with a transmission system 45 and transmission stick 46. In the embodiment shown, the vehicle 37 is an open top model.

The vehicle 37 is provided with a support frame 47 which is generally rectangular shaped and includes elongate, longitudinal frame members 48 interconnected by rear transverse frame member 50 and front transverse frame member 51. It will be noted that each of the longitudinal frame members 48 has a downwardly extending curved rear portion 49. The support frame is mounted the vehicle chassis 38.

A pair of laterally spaced apart, downwardly extending notches plates or hooks 52 are each secured to a longitudinal frame member 13 of the mounting frame 12 adjacent the rear end thereof Each hook 52 is defined by a forwardly facing notch 53. The mounting frame 12 is also provided with a pair of substantially flat latch plates 54 (see FIG. 3). Each latch plate is mounted on the outer vertical surface of a longitudinal frame member 13 adjacent the front end portion thereof Each latch plate 54 is provided with an upwardly opening hook 55.

The support frame 47 of the vehicle 37 is provided with a pair of inwardly projecting pins 56, each being secured to one of longitudinal frame member 48 at the inner surface of the downwardly curved rear end portion 49. In the embodiment shown, the pins 56 extend horizontally towards each other at the rear end of the curved portion 49.

The support frame 47 of the vehicle 37 is also provided with a pair of latch plates 57a, each being secured to the outer vertical surface of one of the longitudinal frame member 48 adjacent the front end thereof A U-shaped latch member 58 has a transverse pin 59 secured to rear threaded portions of the latch member by suitable nuts. The transverse pin 59 projects through an opening in an actuating lever 60 as shown in FIG. 3. The actuating lever 60 has a bifurcated inner end portion 61 which is pivotally connected to an apertured ear 63 by pivot pin 62. The ear is rigidly secured to the outer surface of the latch plate 57a.

It will be seen that the lever 60 enables a user to swing or pivot the U-shaped latch member 58 into engaging latching relation with the hook 55 on the latch plate 54. This over-center action of the latches 57 on opposite sides of the mounting frame allows rapid and easy secure mounting of the front end portion of the mounting frame on the support frame 47 of the vehicle.

When the vehicle 57 is moved in a reverse direction from the position illustrated in FIG. 2 to a position below the elevated mounting frame 12 of the lift apparatus 11, the locking pin 56 will be moved into engaging relation with the hooks 52. When the support jacks are elevated to the transport position (FIG. 1), the over-center latches 57 are shifted to the latching position, then the mounting frame and lift apparatus will be securely mounted on the vehicle supporting frame. It will be appreciated that the reverse operation allows the lift apparatus to be readily removed from mounted relation on the vehicle support frame.

Therefore, when the support jacks 27 and the support member 28 are extended to the ground engaging position, and the over-center latches 57 are shifted to the unlatching condition, the vehicle may be driven forwardly from the lift apparatus. It will be seen that the front jacks will be extended sufficiently to raise the mounting frame 12 slightly from engaging relation with the support frame. The mounting and dismounting of the lift apparatus may be quickly accomplished with a minimum of effort.

Referring again to FIGS. 1 and 2, it will be seen that an angularly shaped elongate upper arm support 65 is provided for supporting the upper arm 23 in a lowered position. The angular support 65 is attached to the floor or deck 15 adjacent the front of the deck and extends vertically upwardly then angularly upwardly and forwardly. A yoke 66 is secured to the upper end of the support 65 for receiving the upper arm 23 therein.

Figure 5:
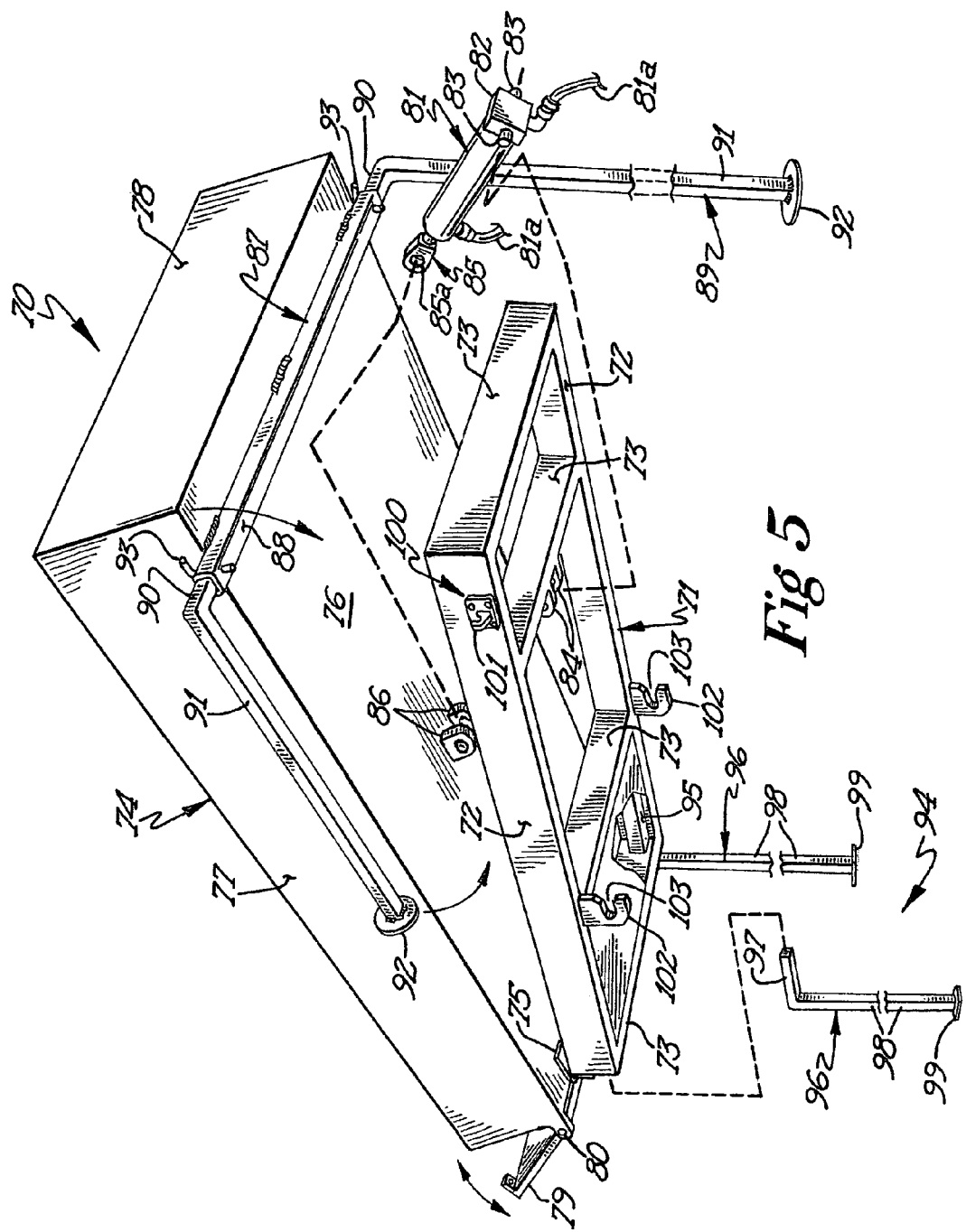
FIG. 5 is a perspective view, partially exploded, of a dump box showing details of construction thereof.

Referring now to FIG. 5, it will be seen that a different utility apparatus, namely a dump truck body, designated generally by the reference numeral 70 is there shown. The dump truck body 70 includes a generally rectangular shaped mounting frame 71 including elongate longitudinal frame members 72 and transverse frame member 73. The dump truck body or box 74 is hingedly connected to the rear transverse frame member 73 by a hinge 75. The dump truck body 74 may be selectively raised and lowered for dumping the contents rearwardly there from.

The truck body or box 74 is of rectangular or parallelepiped configuration and includes a flat floor 76, upstanding vertical side walls 77 and a vertical front wall 78. The truck body 74 also has a tail gate 79 which is hinged along is lower edge portion to the rear edge portion of the side walls 77 by a hinge 80. It will be appreciated that when the truck body 74 is elevated to its rearwardly declined position and the tail gate moved to the open position, the contents of the truck body may be dumped.

A double acting hydraulic lifting cylinder and piston unit 81 is provided for selectively lifting and lowering the truck body. The cylinder is provided with a mounting block 82 having pivot pins 83 for attachment to apertured mounting ears 84. It will be seen that the mounting ears 84 are attached to a vertical rear surface of an intermediate transverse frame member 73. The piston rod of the hydraulic unit 81 is provided with a clevis 85 which is pivotally connected to mounting ears 86 attached to the lower surface of the floor 76. The hydraulic unit 81 is connected by conducts 81a to a hydraulic system on the vehicle.

The dump truck body 70 is also provided with front and rear support leg means 87 and 94 for supporting the truck body in a free standing position. The front support leg means 87 includes an elongate transversely extending square tube 88 secured to the lower surface of the floor 76 adjacent the front end thereof Opposite end portions of the tube 88 has openings there through for accommodating L-shaped locking pins 93 there through.

A pair of elongate L-shaped support legs 89 are provided and these legs 89 are of square cross-sectional configuration. Each leg 89 includes an elongate tube engaging portion 90 integral with an elongate support portion 91. Each tube engaging portion is inserted in one open end of the tube 87. A foot element 92 is secured to the lower end of the support portion. The tube engaging portion is provided with openings there through for accommodating the locking pin 93. The openings are located on opposed surfaces of the tube engaging portion to allow the support legs to be locked in a retracted elevated transport position as shown on the left side of FIG. 5 and in a lowered supporting position as shown on the right side of FIG. 5.

The rear support legs 94 include a hollow square tube 95 secured to the rear transverse frame member 73. A pair of L-shaped support legs 96 includes a tube engaging portion 97 which projects into an end of the tube 95 in the manner of front legs 89. Each support leg 96 also includes a support portion 98 integral with tube engaging portion and having a foot element 99 secured to the lower end thereof The L-shaped legs are rotated 90° between transport and supporting positions in the manner of the front support legs 89. Although not shown, the rear legs 94 are provided with L-shaped locking pins in the manner of the front leg support means.

When the support legs are in the support positions, all four legs will engage the ground surface. When the legs are in the transport position the front legs will be locked in a horizontal rearwardly extending position. When the rear support legs are in the transport position, the legs will extend forwardly in a horizontal position.

The dump truck body is also provided with quick attachment means including a pair of latch plates 100 secured to the outer vertical surfaces of the longitudinal frame member 72 adjacent the front end portion thereof. Each latch plate 100 is provided with a hook 101 which is engaged by the U-shaped over-center latch member 58 on the vehicle support frame. The latch components on the truck body 74 and the vehicle cooperate with each other in the manner of the lift apparatus and vehicle.

The dump truck body is also provided with a pair of locking hooks 102 which are secured to the lower surface of the longitudinal frame members 72 adjacent the rear end portions thereof. The hooks 102 are defined by the forwardly facing slots 103 therein. The locking hooks 102 are engaged by the locking pins 56 on the support frame of the vehicle. The truck body 70 is mounted on the support frame in the manner of the mounting operation of the lift apparatus.

When the truck body 70 is dismounted from the support frame of the vehicle, the rear support legs are moved to the support position and the front latches are unlatched. The truck body is slightly elevated by the hydraulic unit 81 and the front support legs are moved to the support position. The truck box 74 is lowered to its lowered position and the hydraulic unit 81 is disconnected from its connection to the vehicle hydraulic system. The vehicle 37 is then driven forwardly allowing the dump truck body to be freely supported by the front and rear support legs.

The quick attachment means enables a single user to quickly mount and dismount utility apparatus on utility vehicles with a minimum of effort. While the present application discloses two representative type utility apparatus, the quick attachment means would work equally as well on various utility devices. For example, the quick attachment means could be applied to spraying equipment and similar apparatus.

It will be noted that very little modification of existing utility apparatuses is required to equip them with the quick attachment means. It is only necessary to provide such apparatus with the latches, locking hooks and pins, and the support legs or jacks. Such minor modification is inexpensive.

From the foregoing, it will be seen that I have provided a quick attachment means for utility apparatus which permits ready mounting and dismounting of the apparatus on a vehicle.

What is claimed is:

1. A lift apparatus having quick attachments means for cooperating with attachment means on a vehicle having a support frame for readily mounting and dismounting the lift apparatus on and from the support frame of the vehicle, said lift apparatus including a mounting frame having front and rear ends, elongate upper and lower lift arms, means pivotally connecting one end of the lower lift arm to one end of the upper lift arm, means rotatably mounting the lower arm on the mounting frame, and operator bucket mounted on an end of the upper arm, a hydraulic piston and cylinder unit interconnecting the lift arms and being operable for raising and lowering the upper arm relative to the lower arm, a plurality of shiftable support member connected to the mounting frame and being shiftable between a support position, for supporting the lift apparatus in a dismounted condition, and a transport position when the apparatus is mounted on the support frame of the vehicle, the cooperating quick attachment means including a pair of latch members on the mounting frame on opposite sides thereof adjacent the front end for engagement by cooperating latch members on the front end portion of the support frame, a pair of laterally spaced apart lock members on the mounting frame adjacent the rear end of the mounting frame for engaging cooperating lock engaging member on the support frame of the vehicle adjacent the rear end thereof when the lift apparatus is mounted on the vehicle.

2. The lift apparatus as defined in claim 1 wherein said lock members comprise hooks and the cooperating lock engaging members on the vehicle support frame comprise pins.

3. The lift apparatus as defined in claim 2 wherein the locking hook members are engaged by the locking pins on the vehicle frame when the vehicle is moved rearwardly beneath the mounting frame for mounting the lift apparatus on the mounting frame.

4. The lift apparatus as defined in claim 1 wherein the latch members on the mounting frame comprise hooks and the cooperating latch members on the vehicle support frame comprise over center latch elements.

5. The lift apparatus as defined in claim 1 wherein said shiftable support members comprise a pair of power driven vertical jacks secured to the mounting frame adjacent the front end thereof, said jacks being vertically extensible and retractable for movement between a lowered support position and a raised transport position.

6. The lift apparatus as defined in claim 5 wherein a rear vertically adjustable support leg is mounted on the mounting frame adjacent the rear center portion of the mounting frame.

* * * * *